United States Patent [19]

Fiedrich

[11] Patent Number: 5,590,832
[45] Date of Patent: Jan. 7, 1997

[54] HYDRONIC HEATING SYSTEM WITH HIGH AND LOW TEMPERATURE SHOCK PROTECTION

[76] Inventor: Joachim Fiedrich, 20 Red Pine Dr., Carlisle, Mass. 01741

[21] Appl. No.: 275,492

[22] Filed: Jul. 15, 1994

[51] Int. Cl.⁶ ..................................... F24D 3/00
[52] U.S. Cl. ........................................... 237/8 R
[58] Field of Search ............................ 237/8 R, 8 C

[56] References Cited

U.S. PATENT DOCUMENTS

| | | | |
|---|---|---|---|
| 2,262,194 | 11/1941 | Newton | 237/8 R |
| 2,557,368 | 6/1951 | Broderick | 237/8 R |
| 3,168,243 | 2/1965 | Porland | 237/8 R |
| 5,119,988 | 6/1992 | Fiedrich | 237/8 C |
| 5,209,401 | 5/1993 | Fiedrich | 237/8 C |

*Primary Examiner*—William E. Tapolcai
*Attorney, Agent, or Firm*—Robert T. Dunn, Esq.

[57] ABSTRACT

A hydronic heating system having a boiler system supplying relatively hot supply water in a boiler supply line to a heating body or to a heat exchanger that feeds hot water to such a body and a boiler return water line feeding relatively cool boiler system water to the boiler for heating in the boiler has a three-way modulated valve in the boiler system for feeding some of the boiler supply water to the return water line to raise the temperature of the relatively cool boiler system water fed to the boiler for heating in the boiler so that it does not "cold shock" the boiler, includes a control system for the valve that varies the flow of supply water fed to return water line return water raised temperature detector providing feedback control to the valve so that: the flow of supply water to the return water line is increased when the return water raised temperature decreases and so avoid "cold shock" of the boiler; and the flow of heat to the heating body is reduced to avoid "hot shock" to the heating body.

31 Claims, 7 Drawing Sheets

HYDRONIC HEATING SYSTEM WITH HIGH AND LOW TEMPERATURE SHOCK PROTECTION

BACKGROUND OF THE INVENTION

This invention relates to hydronic radiant heating systems and particularly to high temperature shock protection for the system hydronically heated radiating body and low temperature shock protection for the system boiler. Examples of uses of the invention include hydronic radiant heating systems for melting snow and ice from outdoor drives, walks, stations, landing areas, tracks, playing fields, etc.

In any hydronic heating system the boiler return water temperature should not be so low (cool) that it causes flue gas to condense on the boiler tubes or cast iron sections. The boiler flue gas condensation point is typically about 130° F., and at and below that temperature the flue gas condenses and corrodes the outside of the tubes or cast iron sections and the flue gas stack. This is referred to herein as boiler "cold shock".

At the water high temperature end in an hydronic heating system, heat from the hot supply water from the boiler is fed to the heated body can deliver too much heat to the body so that the body is damaged or too hot for comfort. This can happen whether the heated body is a radiator, a conductor of heat to a workpiece or a heat exchanger that heats water fed to an outdoor slab to melt snow and ice on the slab. In the latter case the slab can be at outdoor ambient temperature that may be below zero and the slab and/or the slab heating system can be damaged. This is referred to herein as radiator, conductor (workpiece) or slab "hot shock".

Hydronic snow and ice melting (HSM) systems yield savings by reducing the costs of snow removal and, important for business and commercial establishments, is the investment payback by reduced building cleaning costs through the elimination of salt and sand and carpet damage from tracked in salt and sand. It is estimated that carpet replacement can be reduced to a third as frequent. Above all, slip and fall accident liability around the exterior of the building is dramatically reduced. On hospital emergency entrances and exits, loading docks, ramps, packing areas, helicopter pads and truck scales the installation of a snow and ice melting system is also a safety and accessibility issue. For football and soccer fields, and greyhound race tracks the payback can come from a few saved events.

Automated snow melting systems using electrical heating elements embedded in a concrete slab have been used and are less expensive than hydronic (forced hot water) systems, but have life spans tending around only 10–15 years. Once they break, they're gone. Maintenance and repairs are prohibitive when it comes to breaking open concrete to get at the heating elements.

Hydronic snow melting (HSM) systems cost more than electrical for initial installation, but they are more durable, based on evidence from European and U.S. installations, and operating costs are much lower. In particular, electronically cross-linked polyethylene (PEX) tubing embedded in the slab used widely in Europe and now in the U.S., is guaranteed for 30 years and, like all such warranties, these are conservative estimates of system life. The idea is to build a system that will last a lifetime, or at least outlast the slab in which it is embedded.

A large HSM installation can use over 100,000 lineal feet of 20 mm PEX tubing to cover 90,000 square feet of driveways, walkways, ramps and helicopter landing pad and require over 20 million Btu/hr boiler capacity.

The boiler size for an HSM system is based on BTU/hour/square foot of snow melt area depending on the geographic location of the system; and snowfall, design temperature and wind velocity are all factors. Experience shows that output requirements can range from 150 to 300 BTU/hour/square foot, depending on location. It is most important that the boiler system be of adequate size for the HSM system If the needed BTU's are not available during design conditions the system will not work when needed most.

Insulation beneath the snow melting tubing should be used whenever possible. One inch foam board is sufficient. The tubing should be a suitable thermoplastic material which will stand up to the extreme fluctuations of water temperature cycling and weather conditions. The preferred tubing material with the greatest life expectancy for this application is polyethylene cross-linked electronically, such as the PEX tubing, or cross-linked chemically by the Engel method. The tubing size for most applications is ⅝ inch inside diameter with each HMS slab system circuit (loop) not exceeding 300 ft. Larger tubing diameters are used when longer loops are required Anti-freeze solution of 30% to 50% depending on design temperatures, is mandatory. The non-toxic type anti-freeze is recommended to avoid any potential environmental damage.

Control strategies are numerous depending on system requirements.

a) Intermittent system activation upon snow and ice conditions.

b) Minimum surface temperature maintenance at all times with temperature step-up when conditions call for it.

c) Constant temperature maintenance for soil frost removal in sports facilities. Energy consumption varies greatly depending on the selection of any of these three.

Outdoor slab surface temperature and moisture sensors are used to detect the conditions and activate the system via a programmable set point controller. However, manual system activation and deactivation can be the best method, because anticipating snowfall is the best way to overcome the system's lag time. Anticipating snowfall gives the user time to make the exterior slab surface temperature ready for the first snowflakes. Once considerable snow accumulation occurs (2 to 3 inches) before proper surface melting temperature (38° F. to 40° F.) is achieved, it becomes very difficult for the system to catch up. Even with sufficient boiler horsepower it can become a loosing effort, particularly when wind chill factors come into play.

Proper HSM system supply water and boiler return water temperatures are crucial to protect the boiler and the exterior surface radiator and slab. As mentioned above, the boiler must be protected from excessively cold return water, called "cold shock" and the slab must be protected from excessively hot water, called "hot shock". Some boiler room piping options and electrical controls have been used in efforts to gain these protections. Stainless steel plate heat exchangers are used with conventional steel and cast iron boilers to separate the exterior radiator system (the slab system) that contains anti-freeze in the water, from the boiler system. Low temperature copper and condensing boilers can be directly installed in the system. A boiler two-way by-pass valve has been used in an effort to add hot supply water to the cold return water and so avoid boiler "cold shock". Even the sturdiest boiler cannot withstand the thermal shock that can occur under some operating conditions.

The system may be triggered for operation by dual sensors in the concrete, responding to temperature and moisture conditions. When the concrete gets wet and cold, the sensors tell either the boiler or the valves to respond. Which one gets the signal may depend on one of two modes of operation. The entire system typically gets shut down during the warm weather months, and re-energized sometime in fall when there is potential for freezing temperatures. At that point the user has the choice of operating in either:

1) a pilot status, where all the switches are on and ready to go from a cold start; or
2) an idle mode, in which the system is kept heated to slightly below the freezing mark at all times. The pilot status conserves fuel, but has the disadvantage of slow response time. In starting up from a cold start, a system could be overwhelmed by an early season, heavy snowfall or ice build-up. Most users choose the idle option, which keeps the slab heated to 25° F. to 30° F. at all times, snow or shine, because it is easier operationally and on the equipment to go from 30° F. to the 38° F. to 40° F. required for snow melting, than to try to reach it in a situation where the slab temperature may be well below freezing.

HSM system operation and maintenance shouldn't be any more difficult than normal space heating requirements. The boilers, burners, pumps and valves must be kept functional, but nothing that can be done to the under slab components once they are installed.

The boiler(s) of an HSM system must have high resistance to thermal shock. This points to one of the major differences between an HSM system and the very similar technology of household radiant floor heating (RFH). Whereas RFH boiler supply water gets delivered ideally at gentle temperatures in the 100° F. and lower range, 120° F. to 160° F. is the ideal boiler supply water operating temperature range for an HSM system. In addition, an HSM system operates at about 60 psi and feeds several separate snow melting zones. Here, as in all hydronic systems, the boiler return water temperature must not be so low that the outside of the boiler tubes or cast iron sections is lower than the flue gas condensation temperature of about 130° F. Below that risks corrosion of the boiler tubes or cast iron sections and the stack.

From a technical standpoint, particularly for an HSM system, this is the trickiest part of the system, because the slab system water from the heat exchanger gets exposed to very cold outdoor temperatures as it winds its way through the frigid concrete slab. The tubing is installed, ideally, two inches below the surface and 10 to 12 inch spacing between tubes. In the past, warming the boiler return water to reduce "cold shock" has been done using an electrically controlled, two position, two-way valve for diverting some boiler supply water to the boiler return water line; and at the same time, somehow cooling or diluting the boiler supply water to the 120°–160° delivery range so that the HSM slab system supply water from the heat exchanger is not so hot as to shock the concrete slab.

The present invention has application to many hydronic heating systems including systems that heat principally by conduction as well as radiation and including systems that heat a workpiece, RFH systems for a dwelling and particularly HSM systems, such as described in the specific embodiments, which all make use of three-way modulated, feedback controlled valve systems for reducing boiler "cold shock" and for reducing slab "hot shock".

SUMMARY OF THE INVENTION

It is an object of the present invention to provide a non-electric feedback control for boiler return water temperature in an hydronic heating system to reduce the risk of boiler "cold shock".

It is another object of the present invention to provide a non-electric feedback control for heat flow in an hydronic system to reduce the risk of heated body "hot shock".

It is another object of the present invention to provide a non-electric feedback control for boiler return water temperature in an hydronic system to reduce the risk of boiler "cold shock" and for heat flow to reduce the risk of heated body "hot shock".

It is an object of the present invention to provide a non-electric feedback control for boiler return water temperature in an HSM system to reduce the risk of boiler "cold shock".

It is an object of the present invention to provide a non-electric feedback control for heat exchanger heat flow in an HSM system to reduce the risk of slab "hot shock".

It is an object of the present invention to provide a non-electric feedback control for boiler return water temperature in an HSM system to reduce the risk of boiler "cold shock" and for heat exchanger heat flow to reduce the risk of slab "hot shock".

It is another object to provide such an HSM system that avoids some of the limitations and disadvantages of the prior systems.

It is another object to provide an HSM system with boiler return water temperature control that is satisfactory to avoid boiler "cold shock" having a non-electric control system that can be readily adjusted to set a limit on boiler return low temperature.

It is another object to provide an HSM system with boiler supply water flow control that is satisfactory to avoid slab "hot shock" having a control system that can be readily adjusted to set a limit on heat flow rate to the system heat exchanger that feeds heat to the slab.

It is a particular object of the first embodiment described herein to provide an HSM system with boiler return water temperature control accomplished by diverting supply water to the boiler return line to raise the boiler return water temperature from the system heat exchanger, using a conventional diverting valve in the boiler supply line with a conventional push/release type thermostatic actuator head that is part of a non-electric thermostatic control system.

It is a particular object of the second embodiment described herein to provide an HSM system with boiler return water temperature control accomplished by mixing supply water with the boiler return line to raise the boiler return water temperature from the system heat exchanger, using a conventional mixing valve in the boiler return line with a conventional push/release type thermostatic actuator head that is part of a non-electric thermostatic control system.

It is a particular object of the third embodiment described herein to provide an HSM system with boiler return water temperature control accomplished by diverting supply water to the boiler return line to raise the boiler return water temperature from the system heat exchanger, using a conventional diverting valve in a conventional diverting valve orientation in the boiler supply line with a special release/push type thermostatic actuator head that is part of a non-electric thermostatic control system.

The first embodiment described herein is called: "HSM System With Diverting Valve In Unconventional Orientation In The Supply Line And Return Water Temperature Feedback Control". In this embodiment, a three-way modulated diverting or by-pass valve is provided in the boiler supply line for diverting part of the hot supply water flow to the boiler return line. The diverting valve is connected in an unconventional orientation and is controlled by a conventional push/release type thermostatic actuator head.

A diverting valve divides flow and has one input and two outputs. The conventional orientation of a diverting valve in a system is with the flow through output (herein called the first output) in line with the input and the diverted output (herein called the second output) at a right angle to the input. Inside the diverting valve are two valve discs and seats on one spring loaded stem. One disc and seat controls flow from one output and the other disc and seat controls flow from the other output so that when one opens the other closes and visa versa. In this first embodiment, the diverting valve orientation is not conventional: the input is from the boiler supply line, the first output is to the boiler return line and the second output is to the boiler side of the heat exchanger. Thus, in this embodiment, the diverting valve's "feed through output" is the diverted output of hot supply water to the return line and the valve's diverted output is the feed through supply water to the heat exchanger.

In a diverting valve, the arrangement of stem, spring, discs and seats inside the valve is such that an external pushing force on the stem acts against the spring, moving the stem into the valve, closing the seat to the first output and opening the seat to the second output. Thus, the external pushing force pushes the stem into the valve to decrease flow from the first output while increasing flow from the second output. Similarly, a decrease in the external force releases the stem to increase flow from the first output while decreasing flow from the second output.

The conventional type of actuator head for such a diverting valve for these purposes is referred to herein as a push/release type actuator head. Thus, the diverting valve is a modulated valve and the temperature of in the boiler system is detected and used as a feedback control force to modulate the valve. Uses of thermostatically controlled diverting valves in conventional orientations in the boiler system with conventional push/release type actuators are described in my U.S. Pat. No. 5,119,988 and co-pending U.S. patent application Ser. No. 08/222,884.

The feedback control in the present invention is from the return water temperature at the boiler and is derived from a sensor bulb immersed in the return water or clamped to the return water line next to the boiler so that it is at the temperature of the warmed return water. Fluid from the bulb is connected by a capillary tube from the bulb to the diverting valve actuator head which forces (pushes) the valve stem into the valve against the valve spring, or releases the valve stem so that the valve spring pushes it out and so the valve is modulated to increase or decrease the warming of return water, as necessary to maintain the warmed return water temperature at or above a predetermined value and so avoid "cold shock".

In operation, the bulb fluid volume displaced is representative of the bulb fluid temperature and is delivered to the valve actuator head as a fluid volume. Thus, the feedback bulb fluid volume fed through the feedback capillary to the actuator head represents the warmed return water temperature and is operative through the valve actuator head to exert a force on the valve stem against the valve spring and in that way modulate the valve.

For example, when the feedback volume increases, the force exerted by the valve actuator head on the valve stem increases and this force acts against the valve spring, compressing the valve spring until the actuator force and the spring force are equal. At this balance the new position of the valve calls for less hot supply water flow through the valve to the boiler return line. Thereafter, when the warmed return water temperature decreases, the actuator force decreases and the valve stem is positioned for even more warming. Thus, a modulated diverting valve in an unconventional orientation in the boiler supply line, controlled by a conventional push/release type actuator with a thermostatic detector of the temperature of warmed boiler return water is provided to protect the boiler from "cold shock".

The second embodiment is called: "HSM System With Mixing Valve In The Return Line And Return Water Temperature Feedback Control". It uses a mixing valve in the boiler return line in a conventional mixing valve orientation, controlled by a conventional push/release type actuator with a thermostatic detector of warmed boiler return water provided to protect the boiler from "cold shock". Inside the conventional mixing valve are two valve discs and seats on one spring loaded stem. One disc and seat controls flow from one input and the other disc and seat control flow from the other input so that when one opens, the other closes and visa versa. The usual configuration of such a mixing valve is with the first input in line with the output and the second input at a right angle thereto. The usual orientation of such a mixing valve in a line is with the first input and the output in the line and the second input from another line (in the present invention, from the boiler supply line). Thus, the mixing valve mixes some of the hot supply water with the return water in the boiler return line to warm the return water that reaches the boiler.

The arrangement of stem, spring, discs and seats inside the mixing valve is such that an external pushing force on the stem acts against the spring moving the stem into the valve, opening the seat for the first input (cool return water) and closing the seat for the second input (hot supply water). Thus, for this usual orientation of the conventional mixing valve in the supply line, a conventional push/release type actuator head that pushes the stem into the valve with increased warming of the return water temperature can be used to protect the boiler from "cold shock".

The third embodiment is called "HSM System With Diverting Valve In Conventional Orientation In The Supply Line And Return Water Temperature Feedback Control". It shows the conventional diverting valve in a conventional orientation in the supply line of the boiler system for diverting some hot supply water flow to the boiler return line to warm the return water. It uses a special actuator head that releases the valve stem (rather than pushing it into the valve) with increasing feedback temperature and so increases and decreases warming of the return water as is required. This special actuator head is referred to herein as a release/push type actuator head.

For all embodiments, the feedback from the warmed return water temperature is derived from a sensor bulb immersed in the warmed return water or clamped to the return line next to the boiler so that it is at the temperature of the warmed return water and fluid from the bulb is connected by a capillary tube from the bulb to the three-way nodulated valve (diverting or mixing) actuator head. All embodiments have a readily adjustable, non-electric thermostatic control system, whereby the desired minimum return water temperature can be set to avoid "cold shock".

These and other features of the present inventions are revealed by the following description of embodiments of the inventions taken in conjunction with the figures.

DESCRIPTION OF AN EMBODIMENTS OF THE INVENTION

HSM System And Heat Exchanger

Figure 1:
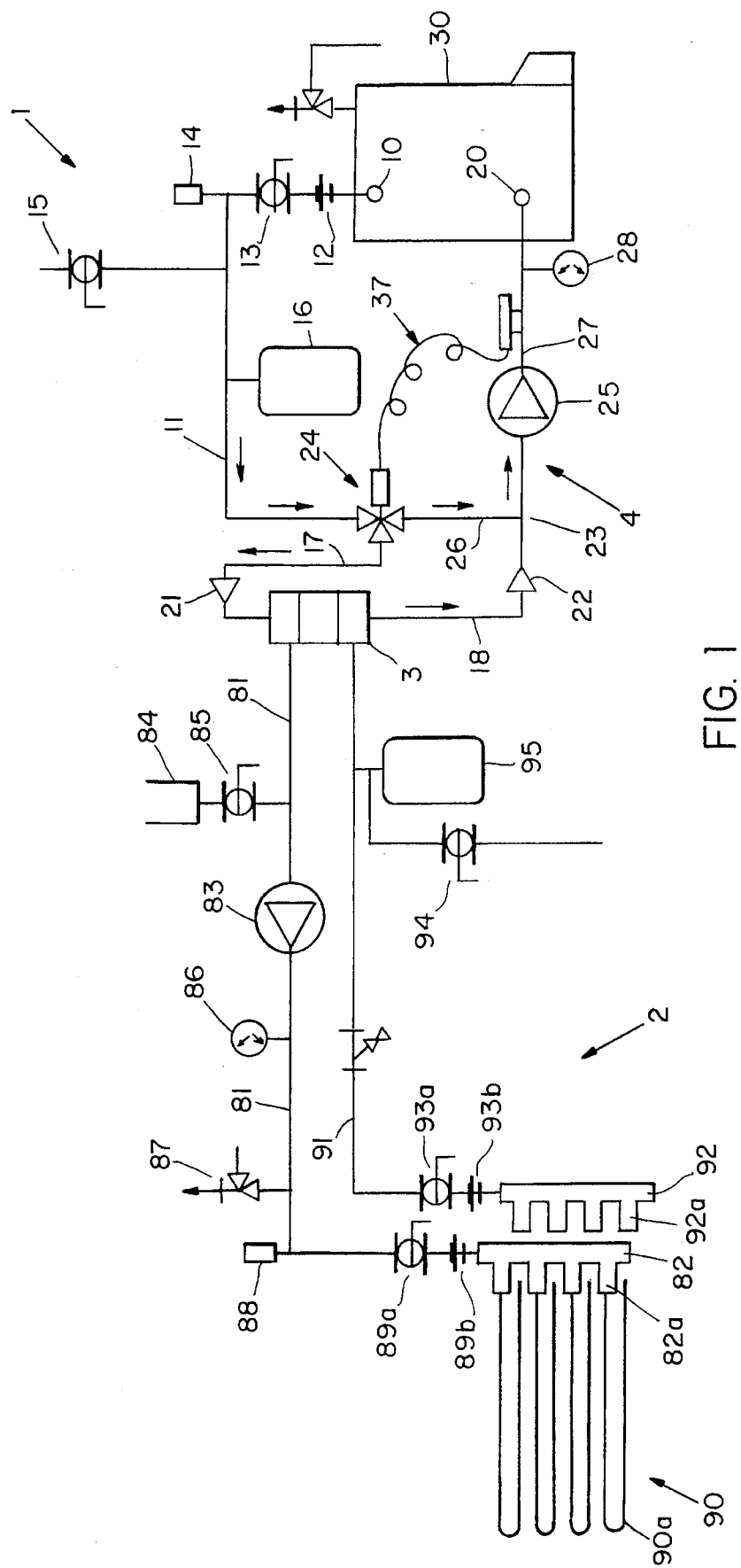
FIG. 1 is a schematic diagram of an HSM system including the boiler system, heat exchanger and slab heating system with boiler "cold shock" and slab "hot shock" protection afforded by a modulated, three-way, thermostatically controlled valve according to embodiments of the invention.

The present invention provide means for limiting the low temperature of the boiler return water in an HSM system using temperature feedback from the warmed boiler return water. FIG. 1 is a schematic diagram of an HSM system incorporating the first embodiment of the present invention.

Boiler System

The HSM system includes a boiler system 1 that supplies the outdoor slab system 2 via heat exchanger 3. The usual requirement of the boiler system is to provide boiler supply water 10 at about 80° F. to 100° F., which is the usual hot water temperature requirement for an HSM system heat exchanger. As shown in FIG. 1, the boiler system distribution station 4 incorporates a three-way modulated diverting valve 24 in an unconventional orientation in supply line 11 to feed some hot supply water to the return water line 18 to warm the return water flow in line 27 to the boiler reservoir 20 and so avoid "cold shock". The boiler supply line 11 to station 4 includes a check valve 12, a manual isolation valve 13, air vent 14, fill line and valve 15, air cushion tank 16, modulated three-way diverting valve 24, the continuation 17 of the supply line and check valve 21 to the primary (boiler) inlet port T1 of heat exchanger 3. The heat exchanger conducts heat from the boiler system water to the slab system water.

Station 4 shown in FIG. 1 incorporates the first embodiment of the present invention wherein a conventional thermostatically modulated three-way diverting valve in an unconventional orientation in the system feeds hot supply water to the return line to warm the return water to avoid "cold shock" and at the same time reduce heat flow (reduce supply water flow rate) to the slab system to avoid "hot shock".

From the primary (boiler) outlet port T4 of the heat exchanger, boiler return line 18 returns water to the boiler return reservoir 20 via check valve 22, T section 23, boiler system pump 25 and warmed return water line 27. Temperature gauge 28 detects and indicates the warmed return water temperature and thermostatic feedback system 37 modulates the valve.

Slab System

The secondary (slab) outlet port T2 of heat exchanger 3 is the source of slab supply water in slab supply line 81 that feeds the slab supply header 82. Between port T2 and the slab system pump 83 is anti-freeze fill tank 84 and manual valve 85 for feeding anti-freeze liquid into the slab water system on the low pressure side of pump 83. From the pump, along line 81 are temperature and pressure gauge 86, pressure relief valve 87, air vent 88, manual shut off valve 89a and check valve 89b.

The slab supply header 82 feeds four (or more) slab heating loops (circuits) 90a, 90b, 90c and 90d that are defined by individual loops of PEX tubing embedded in the slab to distribute snow/ice melting heat to the slab. These loops each run from a connector on header 82 to a connector on the slab system return header 92. For example loop 90a connects by connector 82a to the supply header and connector 92a to the return header.

From slab return header 92, the slab return water line 91 carries slab return water to the secondary inlet port T3 of heat exchanger 3. Along the slab return line are check valve 93b, manual shut off valve 93a, water fill valve and line 94 and air cushion tank 95.

Heat Exchanger

Heat exchanger 3 includes separate passages through and between thermally conductive plates for boiler water flow (the primary flow) and slab water flow (the secondary flow) and so the plates conduct heat from the boiler flow to the slab flow and the two flows are separate and do not mix. A suitable heat exchanger for an HSM system is selected in view of the boiler capacity, BTU/hour, water flow rate, gallons/hour, and pressure loss through the primary passage; and, as mentioned above, the boiler is selected in view of the snow and ice melting load.

Figure 2:
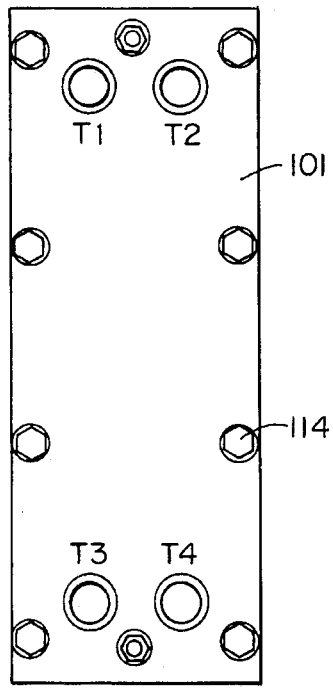
FIGS. 2 and 3 are front and top views, respectively, of a suitable flat plate heat exchanger for use in the HSM system.
Figure 3:
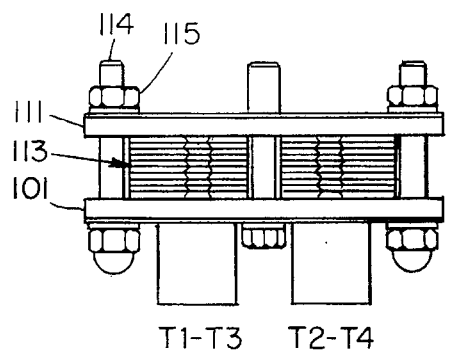
Figure 4:
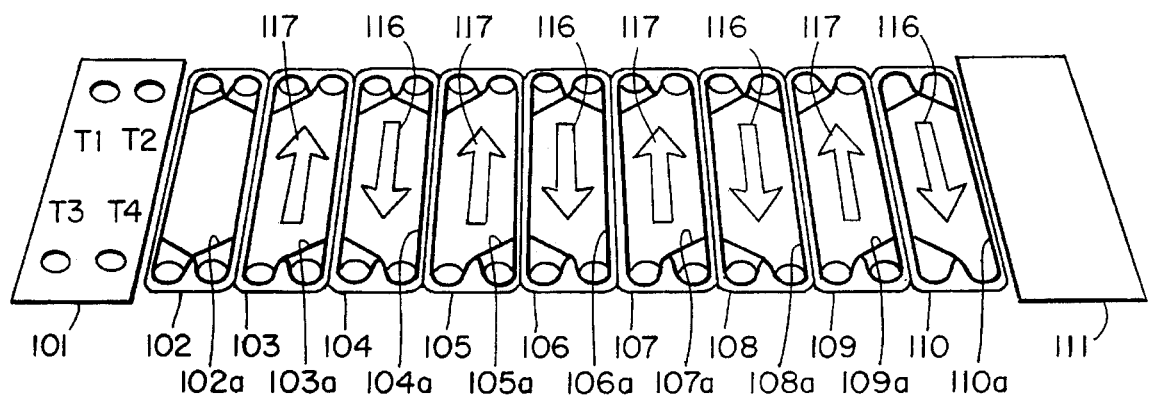
FIG. 4 shows the plates of the flat plate heat exchanger arranged for primary (boiler water flow) and secondary (slab water flow) for 1×1 symmetrical flow.

A multi-stainless steel plate heat exchanger suitable for an HSM system is shown in FIGS. 2 to 4. It has front cover plate 101 with inlet and outlet primary (boiler system) ports T1 and T4, respectively, and inlet and outlet secondary (slab system) ports T3 and T2, respectively. The stainless steel plates 113 are held between front cover plate 101 and back plate 111 and secured so that the gaskets between the plates define the pressure sealed primary and secondary passages through and between the plates, by bolts 114 and nuts 115.

The plates 102 to 110 each have a gasket on the top side thereof as viewed in FIG. 4 and the configurations of the gaskets determines the directions of primary flow on one side of each plate and secondary flow, on the opposite side, as shown in FIG. 4. The configuration shown is referred to herein as 1×1 symmetrical flow configuration; and, as can be seen, the flow directions for primary (boiler) water, in at T1 and out at T4, is represented by arrows 116, while the flow directions for secondary (slab) water, in at T3 and out at T2, is represented by arrows 117.

For the 1×1 symmetrical configuration shown in FIGS. 2 to 4, all of the stainless steel plates are the same and have four passages through them, except plate 110, which has no passages. There are four gasket configurations 102a, 103a, 105a and 106a. Gasket 107a is the same as 103a, 108a is the same as 104a, 109a is the same as 105a and 110a is the same as 104a. This heat exchanger configuration is preferred for HSM for which the boiler supply water temperature and the slab water temperature are relatively low compared to radiant floor heating, RFH, and domestic hot water, DHW, heating. It is also preferred because the boiler and slab temperature drops through the heat exchanger are relatively low compared to RFH and DHW.

Three-Way Modulated Diverting Valve

Three-way modulated diverting valve 24 has one water flow input 24a from supply line 11, receiving hot supply water from the boiler. The through or first water flow output is 24b and the diverted or second water flow output is 24c. In the first embodiment herein the valve is connected to the supply line in an unconventional configuration, whereby the through flow is fed to the return line and the diverted flow is fed on to a continuation od the supply line; and a conventional push/release type actuator head is used. In the third embodiment herein the diverting valve is connected to the supply line in a conventional configuration, whereby the through flow is fed on to a continuation of the supply line and the diverted flow is fed to the return line; however, an unconventional release/push type actuator head must be used.

Figure 7:
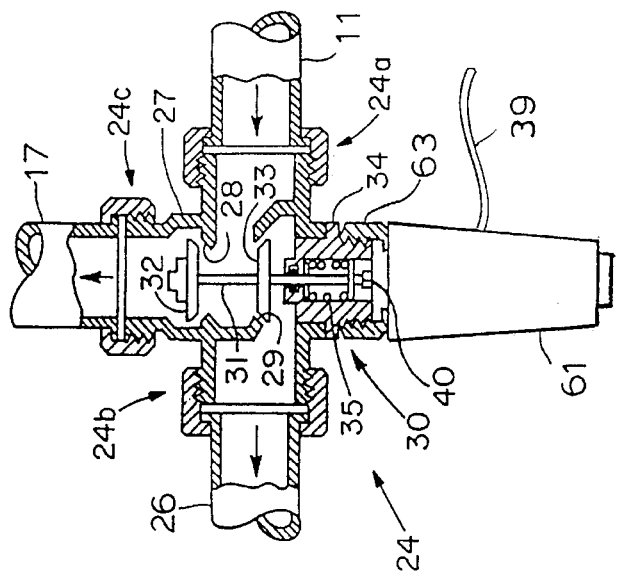
FIG. 7 is a cross section view of a conventional diverting valve with a conventional push/release type actuator head.

The diverting valve shown in cross-section detail by FIG. 7 includes a housing 27 defining the input and two outputs, a diverting flow seat 28 and a through flow seat 29. The valve spindle assembly 30 includes the stem 31, carrying the diverting flow disc 32 and the through flow disc 33 adapted to close against the seats 28 and 29, respectively. The stem is carried by the stem gland assembly 34 that fits tightly to the housing and is sealed thereto, the stem being slidably carried by the gland assembly and the stem is spring loaded by coil spring 35 which urges the stem to move in a direction that closes the diverting water passage 24c and opens the through water passage 24b. When the stem position is changed, the ratio of water flow from one output to water flow from the other output is changed. Modulation of valve 24 is accomplished by moving the stem 31 against spring 35 and is done by delivering a force to the stem to overcome the spring resistance.

The sensor bulbs and capillary contain a fluid that expands as the fluid temperature increases and contracts as bulb temperature decreases, delivering more or less volume of fluid via the capillary to the actuator head, which converts the change in fluid volume to a new position of the valve stem. The conventional push/release type actuator head shown in FIG. 10 responds to an increase in bulb fluid volume by pushing on the valve stem with greater force. The unconventional release/push type actuator head shown in FIG. 11 responds to an increase in bulb fluid volume by releasing the valve stem (exerts less force on the stem).

Sensor bulb 37 is preferably located so as to detect the temperature of the warmed return water flow to the boiler. This can be done using a structure (not shown) for inserting the bulb into the warmed return water line 27 or inserting the bulb into return reservoir 20. It can also be done more simply by attaching the sensor bulb in intimate thermal contact with the outside of return line 27 as shown in FIGS. 1, 5, 6 and 9. For this purpose, the elongated sensor bulb 37 is oriented longitudinally along line 27, partially enclosed by mounting block 41 that also partially encloses line 27 and is secured tightly thereto by strap 42. Block 41 is made of highly thermally conductive material such as copper or aluminum, to insure that the temperature of the fluid in the bulb is substantially the same as the temperature of the warmed return water flowing in line 27 immediately adjacent thereto. Also, this assembly may be covered with an insulating sleeve 43 to insure the equality of temperature. A visible temperature gauge 28 is also attached to line 27.

A suitable three-way diverting valve for use in this system is manufactured by F. W. Overtrop KG, of Olsberg, West Germany. A suitable conventional push/release type valve actuator head, sensor bulb and capillary for such an actuator head is also manufactured by Overtrop.

Push/Release Type Actuator Head

A conventional push/release type actuator head 61 includes a housing 62 that is attached to the valve housing 27 by threaded ring 63 that engages threads on the housing. The actuator head parts are generally figures of revolution about the actuator axis 70 and so all are revealed in FIG. 10. The mechanical function of the head is to respond to bulb fluid volume changes and, accordingly, modulate the valve. An increase in bulb temperature increases the total bulb fluid volume, which expands a bellows in the actuator head, pushing the valve stem 31 into the valve against the resistance of valve spring 35. On the other hand, a decrease in bulb temperature decreases the total bulb fluid volume and the bellows contracts, releasing the valve stem 31, which moves out of the valve as urged by valve spring 35. Thus, the thermostatic actuator head modulates the valve.

Within housing 62, movably contained therein, is the actuator piston 64 that provides stem driver 40 at position 41 in the figure. The stem driver 40 moves toward the valve, in the direction of arrow 42, when the feedback temperature increases. The warmed return water temperature is represented by the bulb fluid volume which expands from the through the capillary tubes 38 into the actuator head bellows 65, causing it to expand inside sleeve 66, driving the sleeve slightly out of housing 62 against captured actuator spring 67 and driving piston 64 in the opposite direction toward the valve. As spring 67 compresses, its force exceeds the compressed force of valve spring 35 and so spring 35 is compressed more, and the valve is positioned to increase through flow from output 24b and decrease flow from output 24c.

FIRST EMBODIMENT

Figure 5:
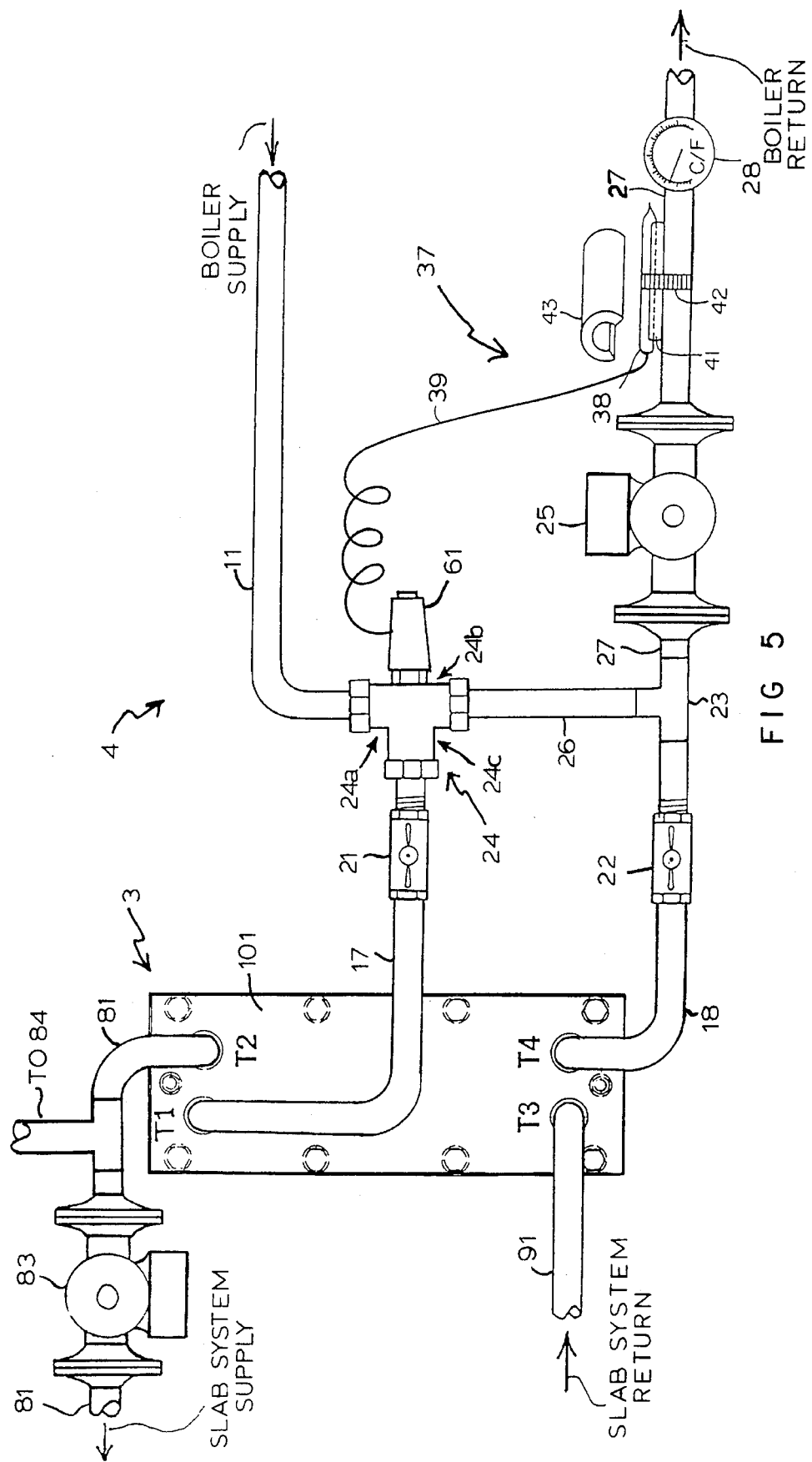
FIG. 5 is a front or elevation view of the first embodiment piping configuration of the distribution station of the HSM system with a modulated three-way diverting valve in unconventional orientation in the supply line of the boiler system, using a conventional push/release type actuator controlled by the warmed return water temperature.
Figure 10:
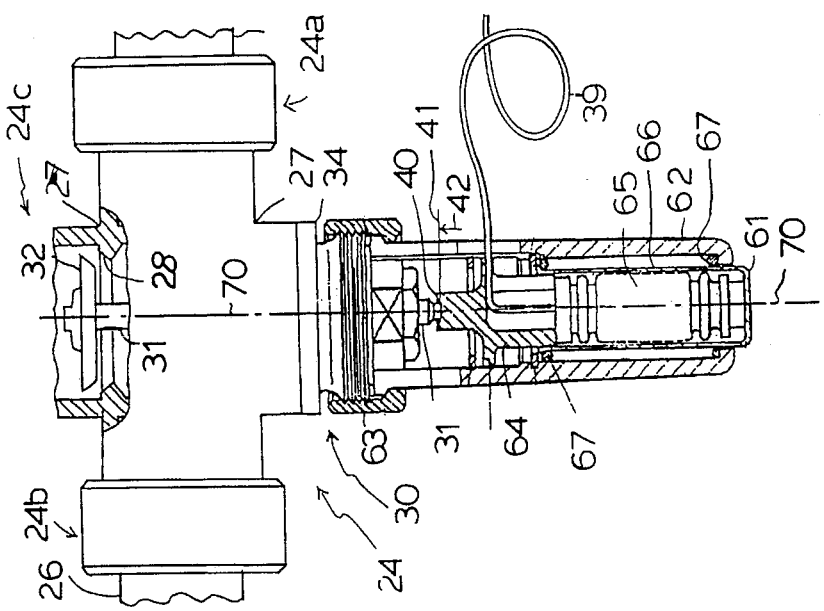
FIG. 10 is a cross section view taken through the axis of a conventional push/release type actuator head for temperature feedback response, attached to the diverting valve in the unconventional orientation or the valve as in the first embodiment effective to modulate the valve as a function of feedback warmed return water temperature.

HSM System With Diverting Valve In Unconventional Orientation In The Supply Line And Return Water Temperature Feedback Control FIG. 5 is a detailed elevation view of the boiler distribution station 4 of the HSM system according to the first embodiment herein already described hereinabove with reference to FIGS. 1, 7 and 10. To repeat: a conventional three-way modulated diverting valve 24 is connected in the boiler supply line 11 in an unconventional orientation; the boiler supply line also includes check valve 21 and the continuation 17 to the heat exchanger and the boiler return line from port T4 of the heat exchanger to the boiler return reservoir 20 includes a return section 18, check valve 22, T connector 23, water pump 25 and warmed boiler return water line 27; a shunt section 26 feeds hot supply water from valve 24 to the T connector so that the return water is warmed before reaching the boiler reservoir; and the temperature feedback system 37 for modulating diverting valve 24 includes bulb 37 attached to line 27, capillary 39 and conventional push/release type actuator head 61 attached to the valve.

The unconventional orientation of diverting valve 24 in the boiler supply line 11 has first input a fed directly by supply line 11, first output 24b (the through output) to shunt 26 that feeds supply water to the return line via T connector 23 and the second output 24c (the diverted output) to the continuation 17 of the supply line.

SECOND EMBODIMENT

Figure 6:
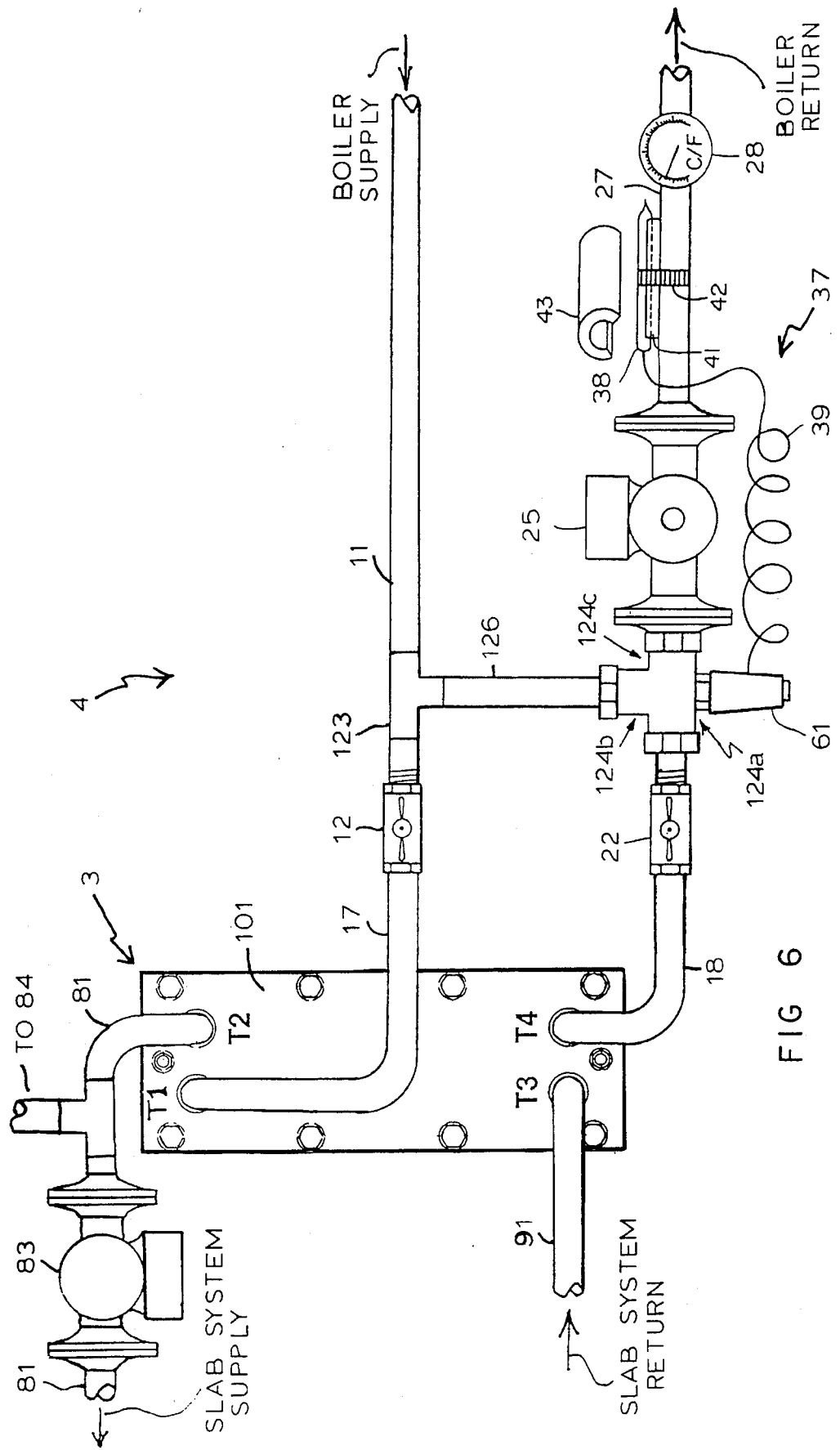
FIG. 6 is a front or elevation view of the second embodiment piping configuration of the distribution station of the HSM system with a modulated three-way mixing valve in conventional orientation in the return line of the boiler system, using a conventional push/release type actuator controlled by the warmed return water temperature.

HSM System With Mixing Valve In The Return Line And Return Water Temperature Feedback Control FIG. 6 shows details of the distribution station 4 incorporating the second embodiment herein: a conventional orientation of a conventional three-way modulated mixing valve 124 in the boiler return line 11.

The return line from the heat exchanger to the boiler return reservoir 20 includes a first section 18 to check valve 26, three-way modulated mixing valve 124, water pump 25 and warmed return water line 27.

The conventional mixing valve 124 has two inputs, a first input 124a, a second input 124b, and one output 124c. In the conventional orientation of this valve the first or through input a is fed directly by supply line 11, the second input 124b is fed by shunt line 126 that feeds supply water to the valve from T connector 123 in supply line 11 and the output is form 124c to the pump 25 and to warmed return water line 27.

Figure 8:
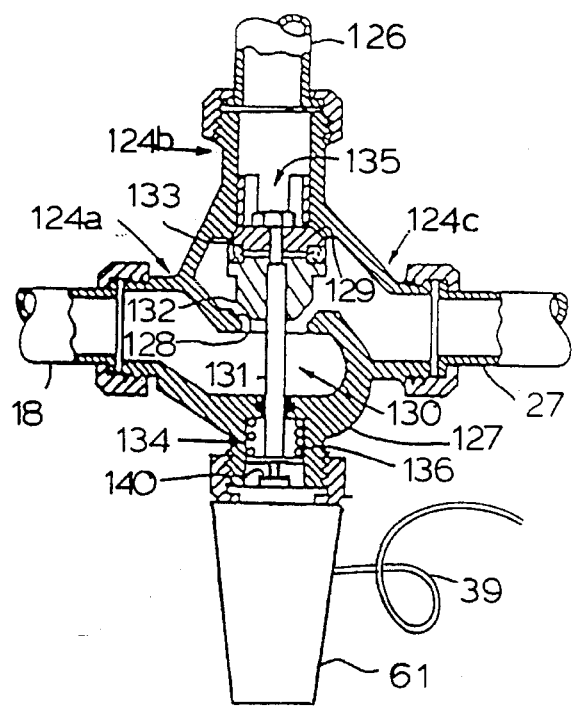
FIG. 8 is a cross section view of a conventional mixing valve with a conventional push/release type actuator head.

A suitable structure of mixing valve 124 is shown in FIG. 8, which is a cross-section view of the valve as it is viewed in FIG. 6 and the cross-section is taken parallel to the plane of the drawing. The valve includes a housing 127 defining the two inputs and the output, a return water flow seat 128 and a supply water flow seat 129. The valve spindle assembly 130 includes the stem 131, carrying the return flow plug 132 and the supply flow plug 133 adapted to close against the return and supply flow seats 128 and 129, respectively. The stem is carried by the stem spring guide assembly 134 at one end, and the shunt input guide assembly 135 at the other end, the stem being slidable carried by these assemblies. In spring guide assembly 134, the stem is spring loaded by coil spring 136 which urges the stem to move in a direction that closes the return water input passage a and opens the supply water input passage 124b from shunt 126 until the return water input passage a is completely closed or the stem hits a stop provided by actuator head 161. This action increases the temperature of the mixed (warmed) return water flowing from the valve output 124c to the pump.

As already described, without the actuator head, mixing valve 124 is modulated by moving the position of the valve stem stop 140 (see FIG. 8) and the stem spring 136 forces the valve stem to follow the stop position until the return flow plug 132 contacts return flow seat 128 shutting off return water flow to the boiler so that only hot supply water flows back to the boiler. The thermostatic, automatic, mixing valve control system 37 provides the mixing valve stem stop, by pushing or releasing the stem, and is shown in the figures. It includes: push/release type, dual temperature, mixing valve actuator head 61, warmed return water temperature thermal sensor bulb 38 and a capillary line 39 from the sensor bulb to actuator head. Actuator head 61 may be the same as actuator head used on the diverting valve in the first embodiment and shown in detail in FIG. 10.

Thus, this second embodiment, incorporating a conventional mixing valve in the conventional orientation in the system return line, uses valve control system 37 that is essentially the same as the diverting valve control system of the first invention and operation of these control systems are similar.

THIRD EMBODIMENT

Figure 9:
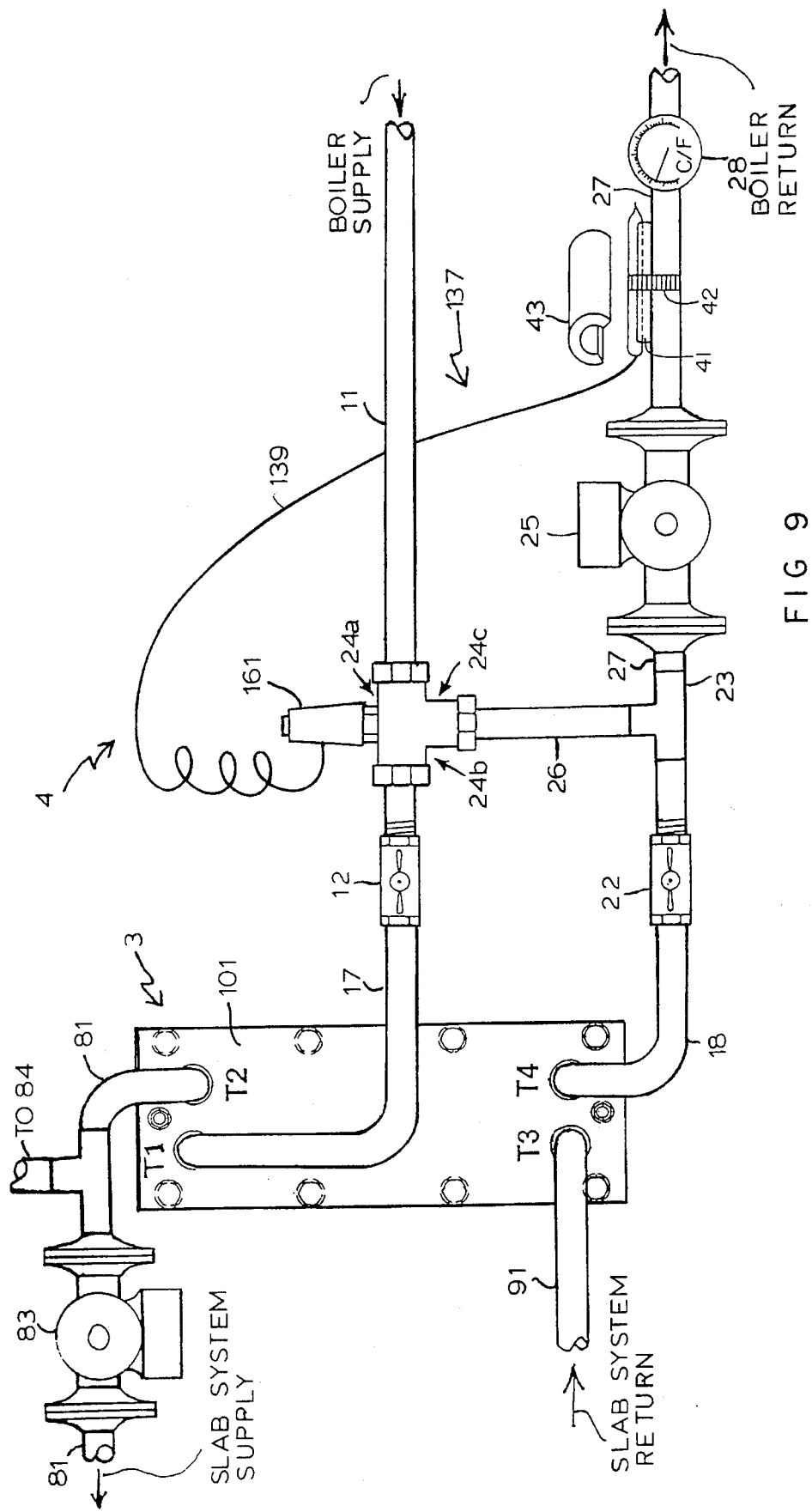
FIG. 9 is a front or elevation view of the third embodiment piping configuration of the distribution station of the HSM system with a modulated three-way diverting valve in conventional orientation in the supply line of the boiler system with a special release/push type actuator controlled by the warmed return water temperature.

HSM System With Diverting Valve In Conventional Orientation In The Supply Line And Return Water Temperature Feedback Control FIG. 9 is a detailed elevation view of the boiler distribution station 4 of the HSM system according to the third embodiment herein. Reference numbers used in this embodiment are the same as in the first embodiment where the parts may be the same and this includes the diverting valve 24 although it has a different orientation in the system. However, this does not apply to the actuator head 261 which is not the same as actuator head 61. Actuator head 261 is a unconventional release/push type designed for this embodiment.

FIG. 9 shows details of the distribution station 3 incorporating a conventional three-way modulated diverting valve 24 in the boiler supply line 11. The boiler supply line also includes check valve 21 and the continuation 17 to the heat exchanger.

The return line 18 from the heat exchanger 3 to the boiler return reservoir 20 includes check valve 22, T section 23, pump 25 and warmed return water line 27 to the boiler return reservoir. The conventional orientation of the diverting valve in the system supply line has first input a fed directly by supply line 11, first output 24b (the through output) to the continuation 17 of the supply line and the second output 24c (the diverted output) to shunt 26 that feeds supply water to the return line via T connector 23.

The temperature feedback system 137 for modulating diverting valve 24 includes bulb 138 attached to line 27, capillary 139 and unconventional (special) release/push type actuator head 161 attached to the valve.

Release/Push Type Valve Actuator Head

Figure 11:
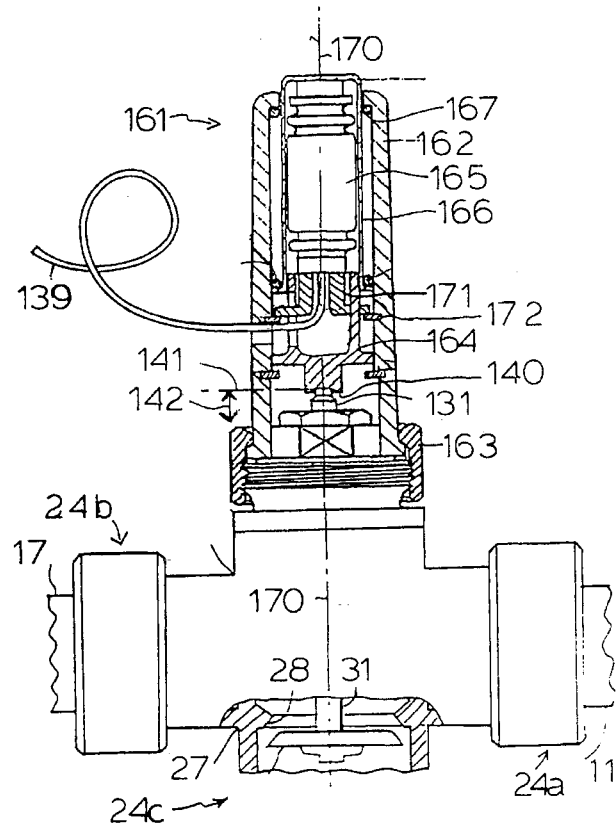
FIG. 11 is a cross section view taken through the axis of the special release/push type thermostatic actuator head that is attached to the diverting valve in the conventional orientation in the supply line according to the third embodiment herein.

Actuator head 161, shown in cross-section detail in FIG. 11, is not a conventional type. It is a special design for non-electric, thermostatic, water temperature feedback temperature control of the conventional diverting valve in the usual orientation in the system supply line. It is part of diverting valve control system 137 in the third embodiment and includes a housing 162 that is attached to the valve housing 27 by threaded ring 163 that engages threads on the housing. The actuator head parts are generally figures of revolution about the actuator axis 170 and so all are revealed in FIG. 11. The function of the head is to provide the stop 140 for the diverting valve stem 31. A decrease in bulb 138 temperature pushes in the valve stem into the valve increasing hot supply water flow to the return line and decreasing hot supply water flow to the heat exchanger.

Within housing 162, movably contained therein, is the stem stop body 164 that provides stop 140 at position 141 in the figure. The stop body 164 is raised higher, in the direction of arrow 142, when the feedback (bulb) temperature is increased. As already described, the bulb temperature is represented by the bulb fluid volume which expands from the bulb 138 through capillary tube 139, into the actuator head bellows 165, which is carried on bellows pedestal 171 that has radial spokes such as 171a and 171b that project through slots such as 164a and 164b in stop piston 164 and abuts bellows stop ring 172, which is embedded in the inside wall of housing 162. This causes the bellows to expand inside sleeve 166, driving the sleeve upward in housing 162 against captured actuator spring 167 and carrying the piston stop 140 upward in the housing in the direction of arrow 142. This, of course raises the stop position 141 and the diverting valve stem follows it as urged by valve spring 36, decreasing the hot supply water flow to the return line (decreasing warming).

CONCLUSIONS

While the invention is described herein in connection with preferred embodiments of HSM systems, it will be understood that it is not intended to limit the invention to those embodiment. It is intended to cover all alternatives, modifications, equivalents and variations of those embodiments and their features as may be made by those skilled in the art within the spirit and scope of the invention for use in HSM systems, heating a workpiece by conduction and/or radiation and RFH and RWH systems in a dwelling, as defined by the appended claims.

I claim:

1. A hydronic heating system having a boiler system supplying relatively hot supply water in a boiler supply line and a boiler return water line feeding relatively cool boiler system water to the boiler for heating in the boiler comprising:
    (a) a three-way modulated valve in said boiler system for feeding some of said boiler supply water to said return water line to raise the temperature of said relatively cool boiler system water fed to the boiler for heating in the boiler,
    (b) means for controlling said valve to vary the flow of said supply water fed to said return water line, including
    (c) means responsive to said return water raised temperature,
    (d) whereby said flow of said supply water fed to said return water line is increased when said return water raised temperature decreases.
2. A hydronic system as in claim 1 wherein:
    (a) said means responsive to said return water raised temperature is a thermostatic three-way valve control system having a return water raised temperature bulb sensor and a thermostatic three way valve actuator and
    (b) a bulb capillary tube connects fluid from said bulb to said valve actuator.
3. A hydronic system as in claim 2 wherein:
    (a) said bulb is attached to said return water line that feeds said return water at raised temperature to said boiler, and
    (b) said thermostatic actuator controls said three-way valve.
4. A hydronic system as in claim 3 wherein:
    (a) said three-way valve has a valve stem whose position determines said valve water flow ratio and a spring that urges said stem to a position of lower ratio and
    (b) said means for controlling varies the position of said valve stem.
5. A hydronic system as in claim 4 wherein:
    (a) said three-way valve has a valve stem whose position determines said valve water flow ratio and a spring that urges said stem to a position of lower ratio,
    (b) said actuator controls the position of said valve stem,
    (c) said actuator includes a bellows and
    (d) said bulb connect by said capillary to said bellows.
6. A hydronic system as in claim 5 wherein:
    (a) said bulb, capillary and bellows contain a common thermostatic fluid that expands as its temperature increases.
7. A hydronic system as in claim 1 wherein said system includes:
    (a) a hydronic heating body system,
    (b) a heat exchanger for thermally coupling said boiler water system and said heating body water system,
    (c) said three-way valve also feeds said relatively hot supply water to said heat exchanger and
    (d) said three-way valve position determines the ratio of said hot supply water fed to said return line to said hot supply water fed to said heat exchanger.
8. A hydronic system as in claim 3 wherein said system includes:
    (a) a hydronic heating body system,
    (b) a heat exchanger for thermally coupling said boiler water system and said heating body water system,
    (c) said three-way valve also feeds said relatively hot supply water to said heat exchanger and
    (d) said three-way valve position determines the ratio of said hot supply water fed to said return line to said hot supply water fed to said heat exchanger.
9. A hydronic system as in claim 7 wherein:
    (a) said heat exchanger provides separate passages therethrough for said boiler system water flow and said heating body system water flow.
10. A hydronic system as in claim 8 wherein:
    (a) said heat exchanger provides separate passages therethrough for said boiler system water flow and said heating body system water flow.
11. A hydronic snow and ice melting (HSM) system having a boiler system supplying relatively hot supply water in a boiler supply line and a boiler return water line feeding relatively cool boiler system water to the boiler for heating in the boiler comprising:
    (a) a three-way modulated valve in said boiler system for feeding some of said boiler supply water to said return water line to raise the temperature of said relatively cool boiler system water fed to the boiler for heating in the boiler, (b) means for controlling said valve to vary the flow of said supply water fed to said return water line, including (c) means responsive to said return water raised temperature, (d) whereby said flow of said supply water fed to said return water line is increased when said return water raised temperature decreases.

12. A hydronic system as in claim 11 wherein:

(a) said means responsive to said return water raised temperature is a thermostatic three-way valve control system having a return water raised temperature bulb sensor and a thermostatic three way valve actuator and (b) a bulb capillary tube connects fluid from said bulb to said valve actuator.

13. A hydronic system as in claim 12 wherein:

(a) said bulb is attached to said return water line that feeds said return water at raised temperature to said boiler, and (b) said thermostatic actuator controls said three-way valve.

14. A hydronic system as in claim 13 wherein:

(a) said three-way valve has a valve stem whose position determines said valve water flow ratio and a spring that urges said stem to a position of lower ratio and (b) said means for controlling varies the position of said valve stem.

15. A hydronic system as in claim 14 wherein:

(a) said three-way valve has a valve stem whose position determines said valve water flow ratio and a spring that urges said stem to a position of lower ratio, (b) said actuator controls the position of said valve stem, (c) said actuator includes a bellows and (d) said bulb connect by said capillary to said bellows.

16. A hydronic system as in claim 15 wherein:

(a) said bulb, capillary and bellows contain a common thermostatic fluid that expands as its temperature increases.

17. A hydronic system as in claim 11 wherein said HSM system includes:

(a) a hydronic slab heating system for melting snow and ice on said slab, (b) a heat exchanger for thermally coupling said boiler system and said slab system, (c) said three-way valve also feeds said relatively hot supply water to said heat exchanger and (d) said three-way valve position determines the ratio of said hot supply water fed to said return line to said hot supply water fed to said heat exchanger.

18. A hydronic system as in claim 13 wherein said HSM system includes:

(a) a hydronic slab heating system for melting snow and ice on said slab, (b) a heat exchanger for thermally coupling said boiler system and said slab system, (c) said three-way valve also feeds said relatively hot supply water to said heat exchanger and (d) said three-way valve position determines the ratio of said hot supply water fed to said return line to said hot supply water fed to said heat exchanger.

19. A hydronic system as in claim 17 wherein:

(a) said heat exchanger provides separate passages therethrough for said boiler system water flow and said slab system water flow.

20. A hydronic system as in claim 18 wherein:

(a) said heat exchanger provides separate passages therethrough for said boiler system water flow and said slab system water flow.

21. A hydronic snow and ice melting (HSM) system having a boiler system supplying relatively hot supply water in a boiler supply line and a boiler return water line feeding relatively cool boiler system water to the boiler for heating in the boiler comprising:

(a) a hydronic slab heating system for melting snow and ice on said slab, (b) a heat exchanger for thermally coupling said boiler system and said slab system, (c) a three-way modulated diverting valve in said boiler supply line for feeding some of said boiler supply water to said boiler return water line to raise the temperature of said relatively cool boiler system water fed to the boiler for heating in the boiler, (d) said three-way valve also feeds said relatively hot supply water to said heat exchanger and (e) said diverting valve position determines the ratio of said hot supply water fed to said return line to said hot supply water fed to said heat exchanger, (f) means for controlling said valve to vary the flow of said ratio including:

(g) means responsive to said return water raised temperature, (d) whereby said flow of said supply water fed to said ratio is increased when said return water raised temperature decreases.

22. A hydronic heating system as in claim 21 wherein:

(a) said means responsive to said return water raised temperature is a thermostatic diverting valve control system having a bulb temperature sensor and a thermostatic diverting valve actuator and (b) a capillary tube connects fluid from said bulb to said diverting valve actuator.

23. A hydronic heating system as in claim 22 wherein:

(a) said bulb is attached to said supply water line that feeds return water at raised temperature to said boiler, and (c) said thermostatic actuator controls said diverting valve water flow ratio.

24. A hydronic heating system as in claim 21 wherein:

(a) said diverting valve has a valve stem whose position determines said valve water flow output ratio and a spring that urges said stem to a position of greater ratio and (b) said means for varying controls the position of said valve stem.

25. A hydronic heating system as in claim 21 wherein:

(a) said diverting valve has a valve stem whose position determines said valve water flow ratio and a spring that urges said stem to a position of greater ratio, (b) said actuator controls the position of said valve stem, (c) said actuator includes a bellows and (d) said bulb connects thermostatically to said bellows.

26. A hydronic heating system as in claim 22 wherein:

(a) said bulb and said bellows contain a common thermostatic fluid that expands as its temperature increases.

27. A hydronic system as in claim 24 wherein:

(a) said heat exchanger provides separate passages therethrough for said boiler system water flow and said slab system water flow.

28. A hydronic system as in claim 25 wherein:
(a) said heat exchanger provides separate passages therethrough for said boiler system water flow and said slab system water flow.

29. A hydronic system as in claim 25 wherein:
(a) said diverting valve has an input, a through output (first output) and a diverted output (second output),
(a) said supply line from said boiler connects to said diverting valve input,
(c) said diverting valve through output connects to said return line,
(c) said diverting valve diverted output connects to said heat exchanger and
(d) said actuator is a push/release type, inasmuch as it pushes on said valve stem to increase said ratio when said bulb temperature rises.

30. A hydronic system as in claim 25 wherein:
(a) said diverting valve has an input, a through output (first output) and a diverted output (second output),
(a) said supply line from said boiler connects to said diverting valve input,
(c) said diverting valve through output connects to said heat exchanger,
(c) said diverting valve diverted output connects to said return line and
(d) said actuator is a release/push type, inasmuch as it releases said valve stem to increase said ratio when said bulb temperature rises.

31. A hydronic snow and ice melting (HSM) system having a boiler system supplying relatively hot supply water in a boiler supply line and a boiler return water line feeding relatively cool boiler system water to the boiler for heating in the boiler comprising:
(a) a hydronic slab heating system for melting snow and ice on said slab,
(b) a heat exchanger for thermally coupling said boiler system and said slab system,
(c) a three-way modulated mixing valve having two inputs and one output, one of said inputs and said output being connected in said return line,
(d) means feeding hot supply water to the other input of said mixing valve
(e) so that some of said boiler supply water is mixed with said boiler return water in said return line to raise the temperature of said relatively cool boiler system return water fed to the boiler for heating in the boiler,
(f) said mixing valve position determines the ratio of said hot supply water and return water that are mixed,
(f) means for controlling said valve to vary said ratio including:
(g) means responsive to said mixed water temperature,
(d) whereby said flow of said supply water fed to said mixing valve is increased when said mixed water temperature decreases.

* * * * *